United States Patent [19]

Gaines et al.

[11] 4,003,667

[45] Jan. 18, 1977

[54] LUBRICATABLE BALL JOINT ASSEMBLY

[75] Inventors: Donald R. Gaines, Farmington Hills; Jon M. Smallegan, Ann Arbor; William H. Trudeau, Brighton, all of Mich.

[73] Assignee: Gulf & Western Manufacturing Company, Southfield, Mich.

[22] Filed: May 21, 1976

[21] Appl. No.: 688,847

[52] U.S. Cl. .................................. 403/36; 403/132; 403/134; 277/212 FB
[51] Int. Cl.² ........................................ F16C 11/06
[58] Field of Search .......... 403/140, 132, 134, 135, 403/138, 36, 35, 40; 277/212 FB; 74/18.1

[56] References Cited

UNITED STATES PATENTS

| | | | |
|---|---|---|---|
| 2,695,185 | 11/1954 | Latzen | 403/140 X |
| 3,135,539 | 6/1964 | Ulderup et al. | 403/36 |
| 3,451,701 | 6/1969 | Smith | 403/140 |
| 3,578,366 | 5/1971 | Snider | 403/134 X |

*Primary Examiner*—Andrew V. Kundrat
*Attorney, Agent, or Firm*—Barnes, Kisselle, Raisch & Choate

[57] ABSTRACT

A ball joint assembly having a ball stud member received in a socket member. The ball of the stud member is retained in a recess of the socket member by a bearing ring urged to bear on the ball by a pair of elastic load rings. A seal received on the socket member defines a lubricant reservoir which is supplied with grease through a grease fitting carried by the socket member. A plurality of passages defined in part by various grooves in the load ring and portions of the bearing ring interconnect the lubricant reservoir, grease fitting and interface of the bearing ring with the ball of the stud member.

10 Claims, 7 Drawing Figures

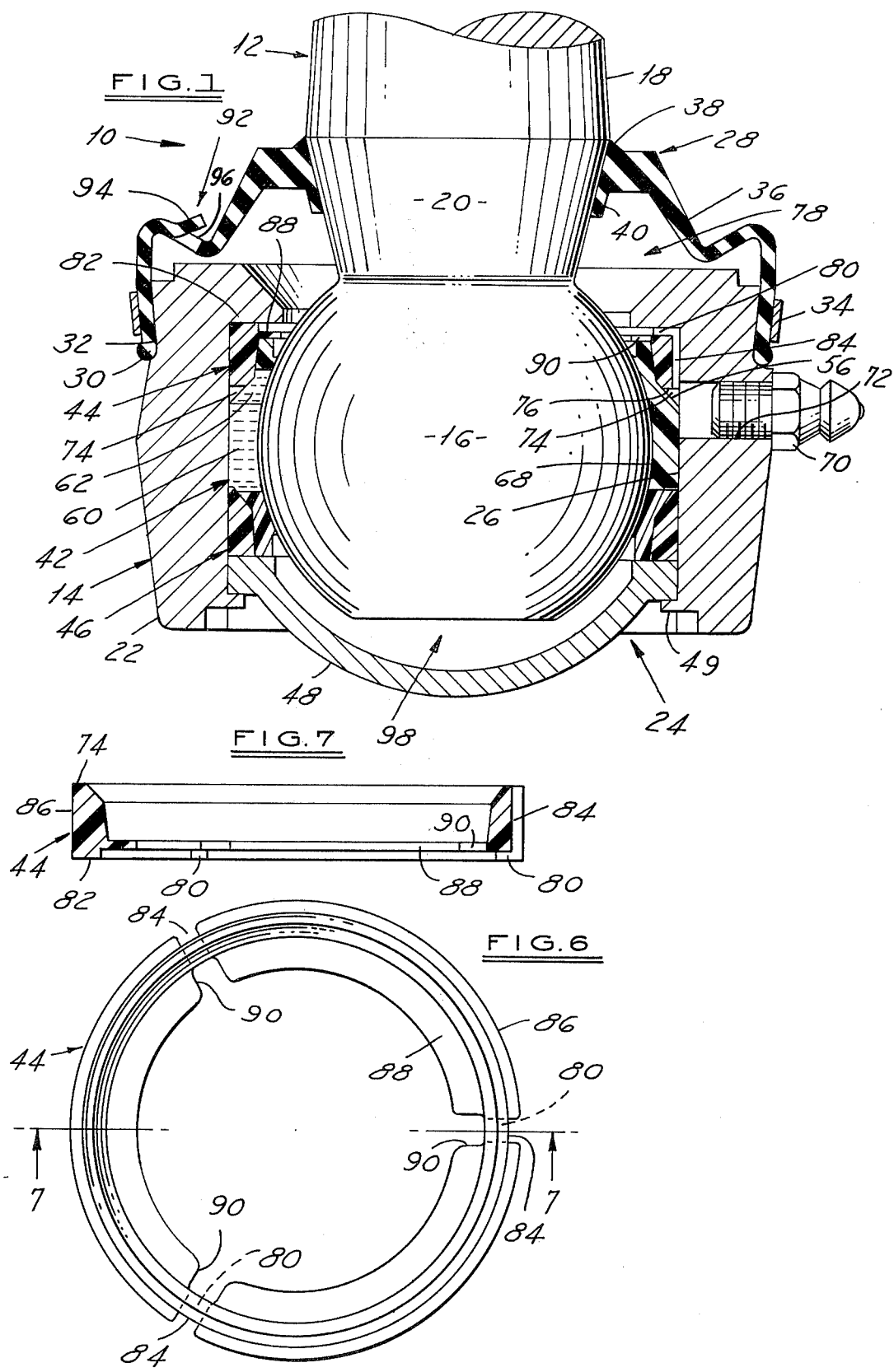

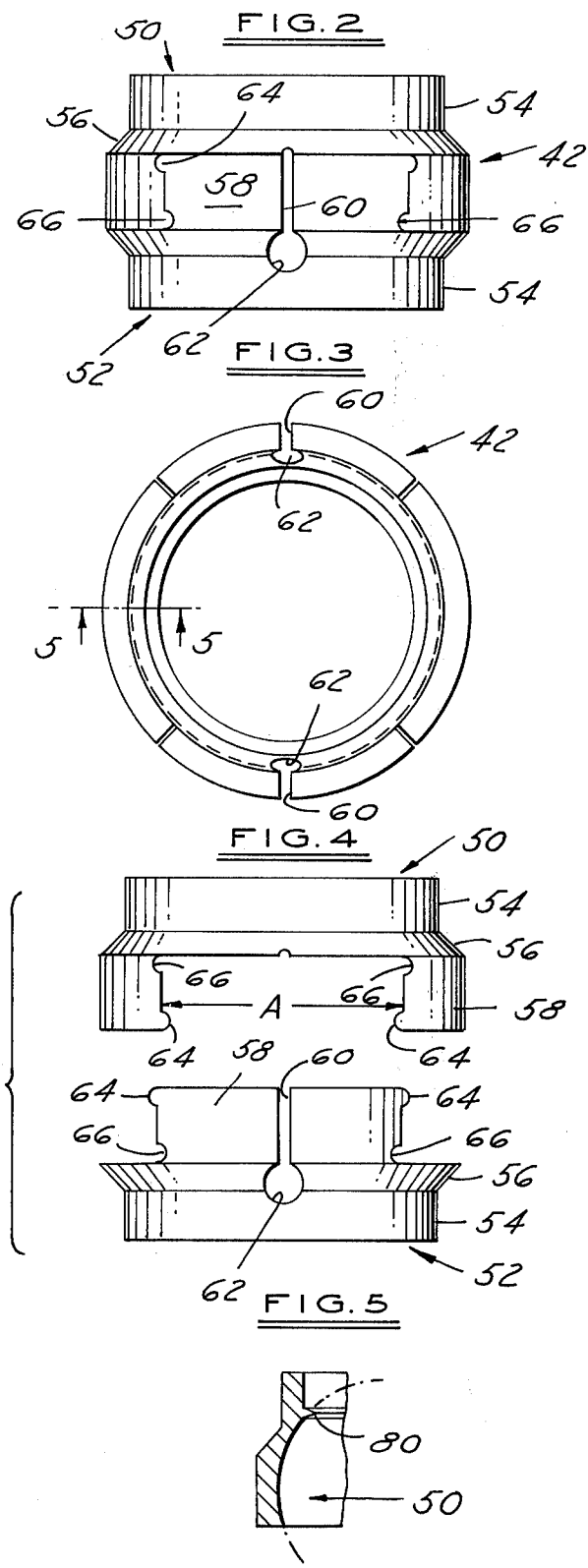

LUBRICATABLE BALL JOINT ASSEMBLY

This invention relates to a ball joint assembly and more particularly to a ball joint assembly commonly used in motor vehicle steering linkages.

Smith U.S. Pat. No. 3,451,701 issued on June 24, 1969 and Snider U.S. Pat. No. 3,578,366 issued on May 11, 1971 disclose previously known ball joint assemblies permanently lubricated with a fatty acid compound which are particularly useful in automotive and light truck steering system linkages. In each of these assemblies the ball of the stud member is retained in a socket member by a plastic bearing ring received in a recess in the socket member. In each of these assemblies permanent lubrication, compensation for wear between the ball and the plastic bearing ring, and a preload torque on the ball of the assembly is provided by a pair of rings of a compressible fiberous material impregnated with the fatty acid lubricant and bearing at least in part on the plastic bearing ring to urge it into firm engagement with the ball of the joint assembly.

The ball joint assemblies used in heavy duty vehicles such as heavy duty trucks, earth movers, tractors, off-the-road vehicles, etc. should be of rugged and durable construction and capable of functioning properly in a dusty, dirty, and moist environment and often with mud, coal particles, cement particles, or other particulate contaminants encrusted on the joint assemblies. Joint assemblies for such heavy duty vehicles are usually provided with grease fittings so that they can be lubricated from time to time while in service to renew the grease and purge any contaminants from the interior of such assemblies.

Objects of this invention are to provide a wear compensated ball joint assembly which can be greased in use, has a long service life, and is rugged, durable, and of economical manufacture and assembly.

These and other objects, features, and advantages of this invention will be apparent from the following detailed description, appended claims, and accompanying drawings in which:

FIG. 1 is a side view in section of a lubricatable ball joint assembly embodying this invention.

FIG. 2 is a side elevation of a bearing ring of the joint assembly of FIG. 1.

FIG. 3 is an end view of the bearing ring of FIG. 1.

FIG. 4 is an exploded side elevation of the two interfitting portions of the bearing ring of FIG. 1.

FIG. 5 is a fragmentary sectional view on line 5—5 of FIG. 3.

FIG. 6 is an end view of the upper load ring of the joint assembly of FIG. 1.

FIG. 7 is a sectional view on line 7—7 of FIG. 6 of the upper load ring.

Referring in more detail to the drawings, FIG. 1 illustrates a ball joint assembly 10 embodying this invention with a ball stud member 12 received in a socket member 14. Ball stud member 12 has a ball 16 connected to a tapered shank 18 by an intermediate neck 20 with a reverse taper. Socket member 14 has a one-piece preferably forged body 22 with an opening 24 therethrough having a cylindrical recess 26 therein. A suitable seal 28 cooperates with ball stud member 12 and socket member 14 to prevent moisture and contaminants from entering the opening through the upper end of ball joint assembly 10.

Seal 28 is a generally cup-shaped member with a circumferentially continuous lip 30 retained in sealing engagement with an inclined surface 32 of body 22 by a clamp band 34. Seal 28 has an undulating wall 36 and a central neck portion 38 with a depending collar 40 urged into sealing engagement with the tapered neck 20 of ball stud member 12 by the resiliency of seal 28. Seal 28 is made of a material such as polyurethane which is flexible, resilient, and oil and weather resistant and has a low coefficient of friction, high resistance to abrasion, and good flexure strength.

Ball 16 of stud member 12 is mounted in socket member 14 by a preload torque and wear compensating assembly having a bearing ring assembly 42 and upper and lower load rings 44 and 46. In assembly a cover 48, bearing ring assembly 42, and load rings 44 and 46 are retained in cylindrical recess 26 with the load rings in a compressed condition by a plurality of circumferentially spaced stakes 49. The compressed load rings 44 and 46 urge the bearing ring assembly 42 into firm engagement with the equatorial area of the ball 16 to provide both a preload torque on the ball 16 of the joint assembly 10 and compensation for in-service wear between the ball 16 and bearing ring assembly 42 so that even though such wear occurs, there is little, if any, play or lost motion between the ball stud 12 and the socket 14 of the joint assembly. Preferably load rings 44 and 46 are made of a polyurethane material such as 12073 polyurethane sold by Ohio Rubber Company, Orthane Division, P.O. Box 1398, Denton, Texas 76201 which is highly oil resistant and resilient and has a high spring rate and a good elastic memory.

As shown in FIGS. 2-4, bearing ring assembly 42 has two interfitted parts 50 and 52 which are preferably identical in form. Each part 50 and 52 has a continuous closed ring end portion 54 with a tapered section 56 which has thereon two opposed generally rectangular and cylindrically curved teeth 58 positioned opposite each other to provide two gaps A therebetween. The cylindrical teeth 58 are each provided with an axial slot 60 therethrough terminating in a hole 62 which both facilitates assembly of the parts 50 and 52 and provides a passage for lubricant.

Preferably when the parts 50 and 52 are assembled with the teeth 58 interengaged, they are interlocked by a small projection 64 (FIG. 4) adjacent the free end of each tooth which is received in a small recess 66 adjacent the other end of a complementary mating tooth. The slots 60 permit the projection 64 of each tooth to move toward each other to allow the parts 50 and 52 to be assembled over the ball 16 from opposite ends thereof so that the teeth can snap into interlocking engagement to provide a unitary bearing ring assembly 42. When parts 50 and 52 are interfitted so that the teeth of each part are received in the gaps A of the other part, they provide bearing ring assembly 42 with a spherical recess 68 (FIG. 1) complementary to and engageable with a substantial portion of the equatorial area of ball 16 of the stud member. In assembly each tooth 58 extends generally axially beyond the equator of ball 16 so that bearing ring assembly 42 overlies the major load carrying portion of the ball so that the bearing ring assembly 42 is not weakened by the interlocking arrangement of parts 50 and 52.

As shown in FIG. 5, preferably each part 50 and 52 has a circumferentially continuous lip 80 adjacent the free end of ring portion 54 which lip in its free state extends generally radially beyond the spherical surface 68 so that when the parts 50 and 52 are assembled on ball 16 the lips 80 are flexed and urged into firm engagement with the surface of ball 16 adjacent the polar regions of the ball to provide a seal preventing particulate contaminants from entering the interface between the ball and spherical surface 68. With this arrangement each angular movement of the ball 16 relative to socket member 14 tends to wipe the ball clean and prevent lubricant from escaping between the ball and the bearing ring assembly 42. The construction and advantages of bearing ring assembly 42 are described in greater detail in Snider U.S. Pat. No. 3,578,366 the disclosure of which is incorporated herein by reference and hence, bearing ring assembly 42 will not be further described herein.

In accordance with this invention, ball joint assembly 10 is constructed and arranged to be lubricated with a grease, such as a conventional chassis grease, injected under pressure into the joint assembly through a grease fitting 70, such as the well-known Alemite fitting, received in a threaded bore 72 in body 22. Grease fitting 70 communicates via bore 72 with a circumferentially continuous feed passage 74 defined by the cooperation of inclined surface 56 of bearing ring assembly 42, the lower end face 76 of load ring 44, and the side wall of cylindrical recess 26. Grease is supplied to the interface of ball 16 with bearing ring assembly 42 through slots 60 and associated holes 62 (only one of which is shown in FIG. 1) therein which interconnect with feed passage 74.

Seal 28 in cooperation with stud and socket members 12 and 14 defines a grease reservoir 78 within ball joint assembly 10. Reservoir 78 communicates with feed passage 74 through passages defined by the cooperation of recess 26 with a plurality of circumferentially spaced grooves 80 extending generally radially across the upper end face 82 of load ring 44 and interconnecting circumferentially spaced grooves 84 extending generally axially across load ring 44 and opening onto the cylindrical side wall 86 thereof.

As shown in FIGS. 6 and 7, upper load ring 44 has a radially inwardly extending flange 88 which in assembly (FIG. 1) overlies and bears on the adjacent end of bearing ring assembly 42. In assembly this flange 88 prevents bearing ring assembly 42 and load ring 44 from shifting axially with respect to each other so that the upper end of the bearing ring assembly would bear on body 22 and thereby block the passages defined in part by grooves 80 and 84 and also substantially decrease the size of or perhaps even eliminate feed passage 74 thereby preventing grease fitting 70 from communicating with lubricant reservoir 78 and slots 60 in the bearing ring assembly. To permit lubricating grease to freely flow between ball 16 and flange 88 of load ring 84 the flange has circumferentially spaced slots 90 therethrough.

To permit used grease and any contaminants carried thereby to be purged or flushed from joint assembly 10 when new grease is injected through grease fitting 70 one or more valves 92 are provided in grease seal 28 as shown in FIG. 1. Each valve 92 has a flap 94 which is moved to the open position shown in FIG. 1 by the passage of grease through an opening 96 in the wall 36 of seal 28. The flap 94 is normally received in opening 96 when grease is not being discharged from the opening and is integral with wall 36 of the seal. The flap 94 and opening 96 of each valve 92 can be readily produced in the wall 36 of seal 28 by cutting a generally U-shaped slot therethrough. When ball joint assembly 10 is in service, the grease in reservoir 78 both lubricates the joint and tends to prevent any contaminants entering the stud end of the joint (such as through valve 92 or around seal 28) from working their way into the interface between bearing ring assembly 42 and ball 16. Periodic in-service greasing of ball joint assembly 10 will usually purge any such contaminants from the joint assembly before such contaminants work into the interface between the ball and the bearing ring assembly. If desired, a reservoir 98 defined in part by cover 48 can also be filled with grease when producing ball joint assembly 10.

We caim:

1. In a joint assembly with a socket member having an opening therethrough with a substantially cylindrical recess therein, a stud member with a ball received in said recess and a stud projecting therefrom through said opening to the exterior of said socket member, a bearing ring substantially coaxially received in said recess and surrounding a relatively large equatorial area of said ball between the polar regions thereof, said bearing ring having a sufficient thickness at its mid section to substantially fill the space in said recess between said ball and said socket member and having portions adjacent each edge of said ring spaced from said recess of said socket member, and load rings of a deformable expansible compressible material each received and compressed between one of said portions adjacent each edge of said bearing ring and said recess of said socket member to urge at least said edge portions of said bearing ring into firm engagement with said ball, the improvement comprising a seal member of a flexible resilient material engaging both said stud and said socket member and both providing a seal therebetween and at least in part defining a lubricant reservoir adjacent said ball, at least one groove extending generally axially across the one load ring adjacent said lubricant reservoir and defining at least in part a grease passage communicating with said lubricant reservoir, and a grease fitting carried by said socket member and communicating with said passage defined at least in part by said groove extending axially across said one load ring such that grease entering said grease fitting under sufficient pressure can flow through said passage defined at least in part by said groove in said one load ring and into said lubricant reservoir.

2. The combination of claim 1 wherein said bearing ring has at least one lubricant passage therethrough communicating with said lubricant reservoir and the interface of said ball with said bearing ring.

3. The assembly of claim 1 which also comprises at least one valve means carried by said seal member and constructed and arranged to permit excess grease under pressure in said reservoir to be discharged through said valve means to the exterior of said joint assembly.

4. The combination of claim 3 wherein said bearing ring has at least one lubricant passage therethrough communicating with said lubricant reservoir and the interface of said ball with said bearing ring.

5. The combination of claim 1 wherein said one load ring and said bearing ring are arranged and constructed to at least in part define a circumferentially continuous grease passage communicating with both said lubricant fitting and said lubricant passage defined at least in part by said groove in said one load ring.

6. The combination of claim 5 wherein said bearing ring has at least on lubricant passage therethrough communicating with said circumferentially continuous passage and the interface of said ball with said bearing ring.

7. The combination of claim 5 wherein said one load ring has a plurality of circumferentially spaced grooves extending generally axially across and opening into the outer periphery thereof to each define in cooperation with said cylindrical recess a lubricant passage communicating with said circumferentially continuous passage, and a plurality of grooves each extending generally radially across the end adjacent said lubricant reservoir of said one load ring and at least in part defining a passage communicating with said lubricant reservoir and one of said passages defined at least in part by one of said grooves extending generally axially across said one load ring.

8. The combination of claim 7 wherein said bearing ring has at least one lubricant passage therethrough communicating with said circumferentially continuous passage and the interface of said ball with said bearing ring.

9. The combination of claim 8 wherein said one load ring has a flange extending generally radially across and bearing on one end of said bearing ring to prevent generally axial movement in one direction of said bearing ring relative to said one load ring.

10. The combination of claim 9 which also comprises at least one lubricant passage extending generally axially through said flange of said one load ring.

\* \* \* \* \*